Dec. 6, 1938.    E. ENGEL    2,139,185
PRESSURE ACTUATED PISTON LOCK RELEASE
Filed Aug. 10, 1937
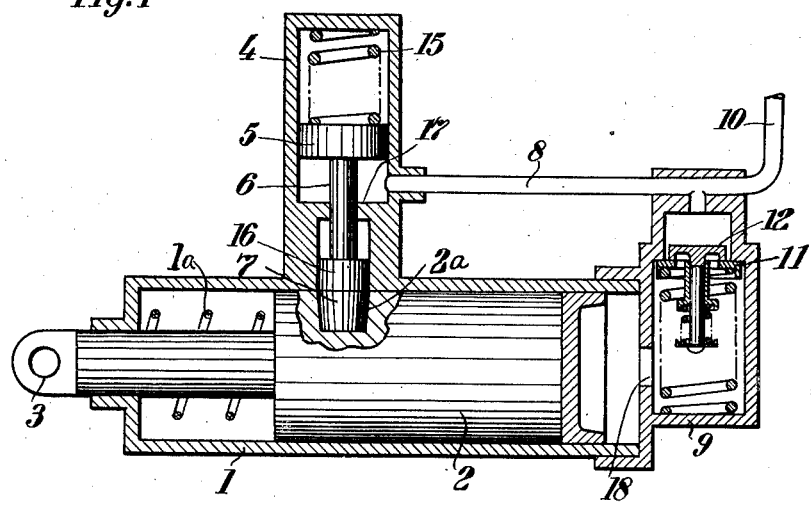
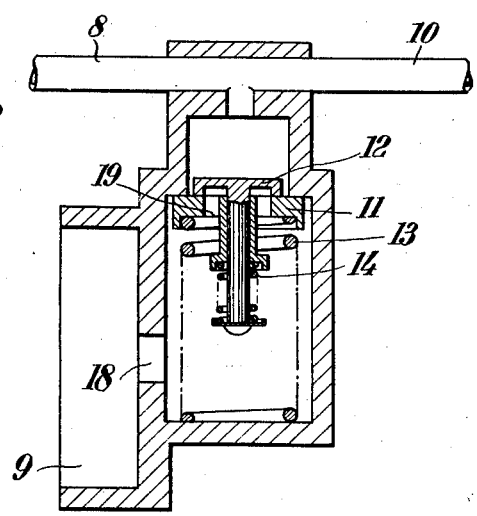
Inventor:
Ernst Engel
By Sommers & Young
Attys.

Patented Dec. 6, 1938

2,139,185

UNITED STATES PATENT OFFICE 2,139,185

PRESSURE ACTUATED PISTON LOCK RELEASE

Ernst Engel, Frankfort-on-the-Main, Germany, assignor to Alfred Teves Maschinen- und Armaturenfabrik Gesellschaft m. b. H., Frankfort-on-the-Main, Germany Application August 10, 1937, Serial No. 158,442
In Germany August 12, 1936

5 Claims. (Cl. 121—40)

The present invention relates to a pressure medium actuated release for a lock which lock serves in known manner to immobilize a piston which is actuated by the same pressure medium.

The particular characteristic feature of the apparatus according to this invention resides in the fact that, during the time of the operation of releasing the lock, the pressure medium actuated piston is not yet under the influence of this pressure medium so that the actuation of the locking bolt is not affected by the influence of pressure medium on the piston, whereby the bolt may be rapidly and positively raised with only a slight pressure of the pressure medium.

An exemplary embodiment of the invention is illustrated in the accompanying drawing, wherein:

Fig. 1 is a side sectional view of the device consisting primarily of pressure cylinder, a lock and release mechanism and a pressure medium controlling valve mechanism;

Fig. 2 is an enlarged side sectional view of the said valve mechanism.

According to Fig. 1, reference character 1 designates a main pressure cylinder having a main piston 2 therein, urged to the right by spring 1a in cylinder 1, or by other resiliently yielding means which may be associated with the apparatus actuated by piston 2. Piston rod 3 connects the piston 2 to the apparatus to be actuated thereby. Mounted on the main cylinder and extending transversely thereto is another cylinder 4, having a piston 5 which is connected with locking bolt 7 through the piston rod 6, the piston 5 and bolt being urged downwardly into locking position by spring 15. The piston 2 is provided with a locking abutment which is herein illustrated as a recess 2a, into which locking bolt 7 is adapted to seat.

Cylinder 4 is connected through conduit 8 with a valve housing 9 which may be mounted on the end of cylinder 1 opposite piston rod 3, said valve housing serving also as a closure for pressure cylinder 1. Another conduit 10 connects the valve to the pressure medium source, for instance, a pump, reservoir or the like.

The valve itself consists of two inter-nested, semi-independently operating valves 11 and 12 the stems of which are telescopingly arranged, and the heads of which are arranged to seat one upon the other. The resultant double valve as a whole is supported and pressed by spring 13, while a spring 14 tends to retain smaller valve 12 on its seat in the head of valve 11.

It is thus apparent that pressure from above tends to move large valve 11 downwardly together with small valve 12 carried thereby against the influence of spring 13. On the other hand, pressure from below tends to close large valve 11, but to raise small valve 12 from its seat on the large valve head against the influence of spring 14.

In operation the invention performs as follows:

Springs 13 and 15 are of such relative strengths that, upon introduction of the pressure medium into conduits 10 and 8, piston 5 is moved first, spring 15 being only of sufficient strength to securely retain locking bolt 7, which is connected to piston 5, seated in its recess in piston 2. Accordingly, locking bolt 7 is first raised out of its recess in piston 2 until the collar 16 of the locking bolt comes into contact with stop 17 projecting into cylinder 4. Only then is the force of spring 13 in valve housing 9 overcome so that valve 11 opens and the pressure medium can also flow into cylinder 1 through opening 18. Upon release of the piston 2 by the locking bolt, and application of pressure thereto by the above-described procedure, piston 2 is moved to the left, actuating the apparatus connected to piston rod 3.

Upon release of the pressure on piston 2, the piston returns to its original position, this movement being effected by the action of a spring 1a or the like, or by resilient means associated with the apparatus actuated by the piston (not illustrated). The pressure medium on the right side of the piston 2 must then be able to return to the source thereof through valve housing 9 and conduit 10. This is the purpose of the openings 19 provided in valve head 11 and of valve 12 which ordinarily closes these openings, the pressure of spring 14 on valve 12 being so slight that it yields directly to the returning pressure medium.

What I claim is:

1. Pressure actuated piston lock release comprising in combination a cylinder having a piston therein, said piston having a locking abutment, a source of fluid pressure medium for actuating the piston, a locking bolt adapted to engage the locking abutment of the piston to retain the piston in non-operating position, pressure actuated means for withdrawing said bolt from the piston locking abutment to release the piston, a system of conduits connecting the cylinder and the pressure actuated bolt withdrawing means with said source of fluid pressure medium, and valve means connected in said system of conduits serving to supply fluid pressure medium to the bolt withdrawing means in advance of the cylinder so as to release the piston lock before applying actuating force to the piston, said valve means having spring control and regulating means serving to limit the residual pressure on the piston when not in operation 2. Pressure actuated piston lock release comprising in combination a cylinder having a piston therein, said piston having a locking abutment, a source of fluid pressure medium for actuating the piston, a locking bolt adapted to engage the locking abutment of the piston to retain the piston in non-operating position, pressure actuated means for withdrawing said bolt from the piston locking abutment, a system of conduits connecting the cylinder and the pressure actuated bolt withdrawing means with said source of fluid pressure medium, and a double valve having inter-nested heads adapted to open under the influence of pressure in opposite directions connected in said system of conduits serving to supply fluid pressure medium to the bolt withdrawing means in advance of the cylinder so as to release the piston lock before applying actuating force to the piston.

3. Pressure actuated piston lock release comprising in combination a main cylinder having a main piston therein, said piston having a locking abutment, a source of fluid pressure medium for actuating the piston, a locking bolt adapted to engage the locking abutment of the main piston, bolt actuating means including a cylinder and piston for withdrawing said bolt from piston locking position, spring means urging said bolt into locking position, conduits connecting the main cylinder and the bolt actuating cylinder with the source of fluid pressure medium, and valve means for controlling flow of fluid pressure medium to the main cylinder and comprising a pair of inter-nested valves having a spring urging said valves closed against the fluid pressure medium supplied from said source, said valve spring being of greater strength than the bolt urging spring, so that the bolt is withdrawn from piston locking position in advance of the application of fluid pressure medium to the main piston.

4. Pressure actuated piston lock release comprising in combination a cylinder having a piston therein, said piston having a locking abutment, a source of fluid pressure medium for actuating the piston, a locking bolt adapted to engage the locking abutment of the piston to retain the piston in non-operating position, pressure actuated means for withdrawing said bolt from the piston locking abutment, a system of conduits connecting the cylinder and the pressure actuated bolt withdrawing means with said source of fluid pressure medium, and valve means connected in said system of conduits serving to supply fluid pressure medium to the bolt withdrawing means in advance of the cylinder so as to release the piston lock before applying actuating force to the piston, said valve means comprising a pair of inter-nested valves, one of which is mounted on the other, said other valve having an opening for return of fluid pressure medium from the cylinder, said one valve serving to close said opening against flow of fluid pressure medium toward said cylinder, but to open under the influence of pressure from the direction of the cylinder.

5. Pressure actuated piston lock release comprising in combination a cylinder having a piston therein, said piston having a locking abutment, a source of fluid pressure medium for actuating the piston, a locking bolt adapted to engage the locking abutment of the piston to retain the piston in non-operating position, pressure actuated means for withdrawing said bolt from the piston locking abutment, conduits connecting the cylinder and the pressure actuated bolt withdrawing means with said source of fluid pressure medium, valve means connected in said conduits serving to supply fluid pressure medium to the bolt withdrawing means in advance of the cylinder so as to release the piston lock before applying actuating force to the piston, a housing in which said valve means is located, said housing being connected to the cylinder and serving as a closure for said connection, and valve means for allowing return of fluid from the cylinder to the conduits, said last-mentioned valve means having spring control means serving to limit the fluid pressure on the piston when not in operation.

ERNST ENGEL.